United States Patent [19]
Wilton et al.

[11] Patent Number: 6,130,953
[45] Date of Patent: Oct. 10, 2000

[54] HEADSET

[75] Inventors: Raymond J. Wilton, Sussex, United Kingdom; Maria A. Wagner, München, Germany

[73] Assignee: Knowles Electronics, Inc., Itasca, Ill.

[21] Appl. No.: 09/094,276

[22] Filed: Jun. 9, 1998

[30] Foreign Application Priority Data

Jun. 11, 1997 [DE] Germany ........................... 197 24 667

[51] Int. Cl.⁷ .................................................. H04R 25/00
[52] U.S. Cl. .......................... 381/375; 381/383; 381/377; 379/430
[58] Field of Search .................................... 381/370, 374, 381/376, 379, 383, 386, 377, 375, FOR 140, FOR 150; 379/430

[56] References Cited

U.S. PATENT DOCUMENTS

| | | | |
|---|---|---|---|
| 3,555,207 | 1/1971 | Cech | 379/430 |
| 3,869,584 | 3/1975 | Wilde | 179/156 |
| 3,908,097 | 9/1975 | Higgins, Jr. | 379/430 |
| 3,971,900 | 7/1976 | Foley | 379/430 |
| 3,971,901 | 7/1976 | Foley | 379/430 |
| 4,020,297 | 4/1977 | Brodie | 179/156 |
| 4,404,434 | 9/1983 | Pelt et al. | 381/383 |
| 4,409,442 | 10/1983 | Kamimura | 179/156 |
| 4,463,223 | 7/1984 | Yamanoi et al. | 381/383 |
| 4,597,469 | 7/1986 | Nagashima | 181/129 |
| 4,609,786 | 9/1986 | Omoto et al. | 379/430 |
| 5,095,382 | 3/1992 | Abe | 359/189 |
| 5,177,784 | 1/1993 | Hu et al. | 379/430 |
| 5,185,807 | 2/1993 | Bergin et al. | 381/378 |
| 5,369,857 | 12/1994 | Sacherman et al. | 379/430 |
| 5,438,626 | 8/1995 | Neuman et al. | 381/383 |
| 5,708,725 | 1/1998 | Ito | 381/183 |

FOREIGN PATENT DOCUMENTS

| | | | |
|---|---|---|---|
| 3118294 | 5/1981 | Germany | H04R 1/10 |
| 4019529 | 6/1990 | Germany | H04R 1/10 |
| 59/210790 | 11/1984 | Japan | H04R 1/10 |
| 2/246598 | 10/1990 | Japan | H04R 1/10 |
| 6/351090 | 12/1994 | Japan | H04R 1/10 |
| 681841 | 11/1990 | Switzerland | H04M 1/05 |
| 95/20303 | 7/1995 | WIPO | H04R 1/10 |

OTHER PUBLICATIONS

Multi-Tasking with Aurea, ACS Wireless, Inc. Publication 1997.

*Primary Examiner*—Wing F. Chan
*Assistant Examiner*—P. Dabney
*Attorney, Agent, or Firm*—Senniger, Powers, Leavitt & Roedel

[57] ABSTRACT

A headset including a housing, a resilient, convex headband fixed to the housing, an earphone fixed to the housing and displaceable relative to one end of the headband and a microphone fixed to a swivel arm that is on the housing. The headband has two spaced hinge joints arranged such that interconnected portions of the headband are pivotable towards one another from a position of use into a closed position in which the portions face one another. A retainer locks the headband in the closed position.

12 Claims, 5 Drawing Sheets

HEADSET

BACKGROUND OF THE INVENTION

The present invention relates to a headset of the type known from WO 95/20303. This headset has at least one earphone, a microphone and a headband and enables the user to communicate over a certain distance, leaving both hands free for other tasks. Examples of areas in which headsets are used are telephony, linguistic communication with computers equipped for speech recognition, machine control, radio communication by pilots and divers, the military sector or simultaneous interpreting. Normally, these headsets have only one earphone so that the user can hear surrounding noises with the other ear. Most headsets are connected to a base station by a cable, which restricts the freedom of movement of the wearer (cf. DE 4019529 AJ or U.S. Pat. No. 3,869,584). In order to ensure that the headset is securely held in place when the wearer moves, most headsets have a headband spanning the upper part of the head, with the result that the headset takes up a relatively large amount of space.

U.S. Pat. No. 4,020,297 discloses a headset without a headband and attached solely to one ear of the wearer. A telescopic arm, provided with a microphone at its free end, is fixed directly to the earphone. Even if this headset is very light, a firm hold is only ensured in the event of the wearer making a sudden movement if the fastening clip of the earphone tightly surrounds the wearer's ear, which becomes uncomfortable if worn for a long period. Furthermore, the ear clip would then either have to be adjustable or be made in different sizes, resulting in high production costs. Incidentally, this headset is also connected to a base station by a cable.

CH 681 841 A5 discloses a headset having an earphone attachable to the ear and connected to a throat loop by a cable, the throat loop carrying a throat microphone responding to vibration. In this case too, the earphone and the microphone are connected to a base station by a cable.

A brochure issued by ACS Wireless, Inc., publication no. 63-a, printed in the USA January 1997 under the title "MULTI-TASKING with AUREA", discloses a headset which establishes a radio link with a base station via ten selectable radio channels in the frequency range between 46.61 and 49.99 MHz. A transmitting and receiving unit, an antenna and a battery are therefore arranged in a housing of the headset. Consequently, the headset is relatively bulky and is operated in the frequency range of radio channels, which is undesirable for some users. The aforementioned disadvantages are to be eliminated by the invention.

SUMMARY OF THE INVENTION

An object of the invention is to improve the headset of the initially mentioned type in such a manner that it is light and comfortable to wear and only takes up a very small amount of room when not in use, including when in storage and during transportation.

Briefly, apparatus of this invention is a headset including a housing, a resilient, convex headband fixed to the housing, an earphone fixed to the housing and displaceable relative to one end of the headband and a microphone fixed to a swivel arm that is fixed to the housing. The headband has two spaced hinge joints arranged such that interconnected portions of the headband are pivotable towards one another from a position of use into a closed position in which the portions face one another. A retainer locks the headband in the closed position.

A feature of the invention is that the headband is collapsible and lockable when collapsed. The headset therefore only requires an extremely small amount of room when not in use and reliably retains its collapsed form. In particular, the headband has two spaced hinge joints and is consequently divided into at least three portions preferably of substantially the same length.

According to a further development of the invention, the headband, an earphone and a microphone are fixed to the housing, the individual portions of the headband being positioned as close to the housing as possible when the headset is collapsed and also being substantially adapted to the shape of the housing. The hinge joints are therefore arranged so that the portions of the headband are pivotable towards the housing.

Information transmission between the headset and a base station preferably takes place by means of infrared light. For this purpose, suitable infrared transmitting and receiving diodes are arranged in the earphone. The earphone is rotatable relative to the housing so that the transmitting and receiving diodes can be directed towards the base station by rotating the earphone. The earphone preferably has one or two attachment clips forming a free space opposite a receiver capsule so that the earphone can be attached to the wearer's ear. The free space extends over an angular range of at least 180°, and thus the earphone can be worn on either the left or the right ear and the IR transmitting and receiving diodes can always be directed in the line of sight of the wearer.

Other objects and features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
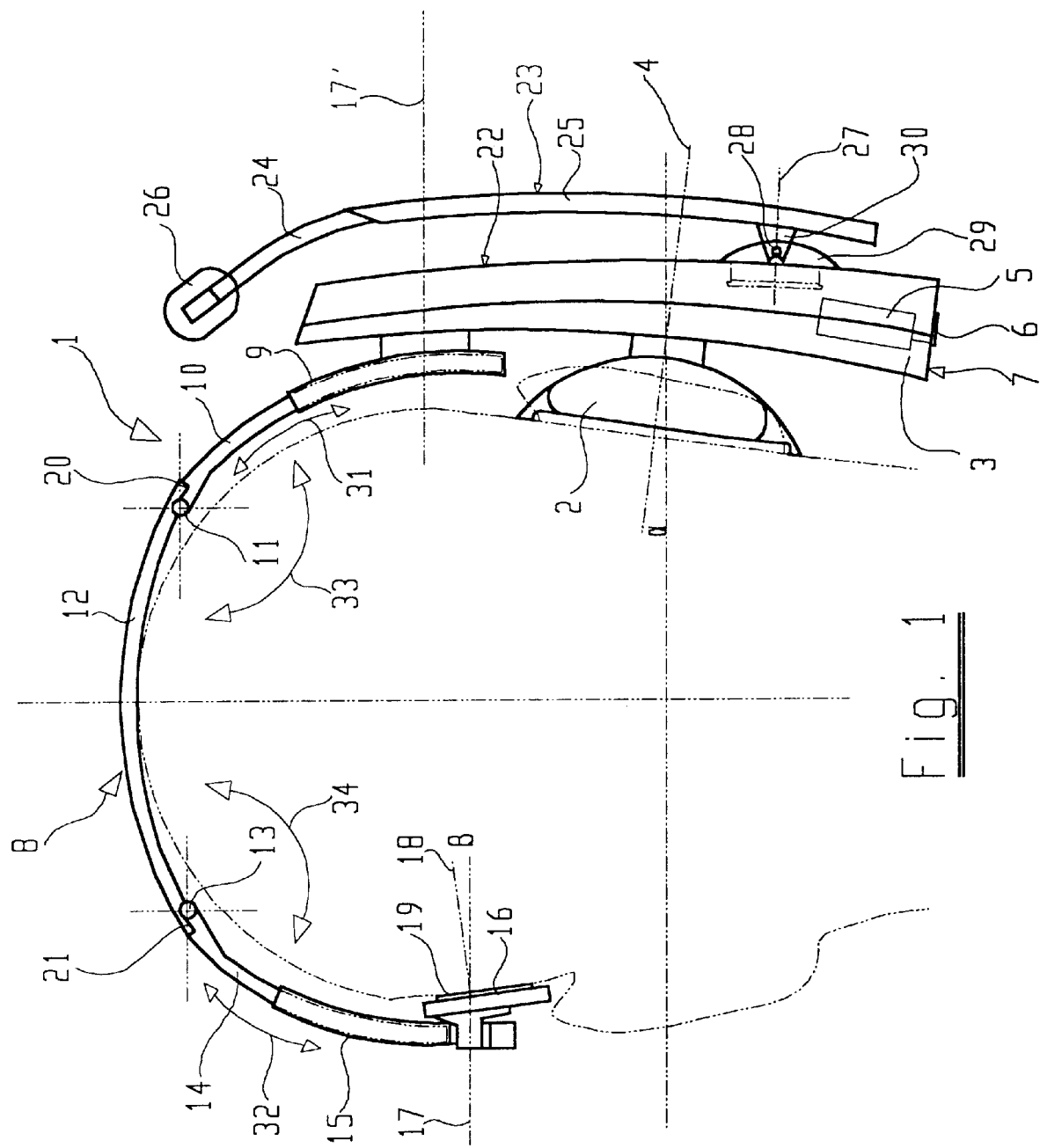
FIG. 1 shows a front view of the headset in the position of use.
Figure 3:
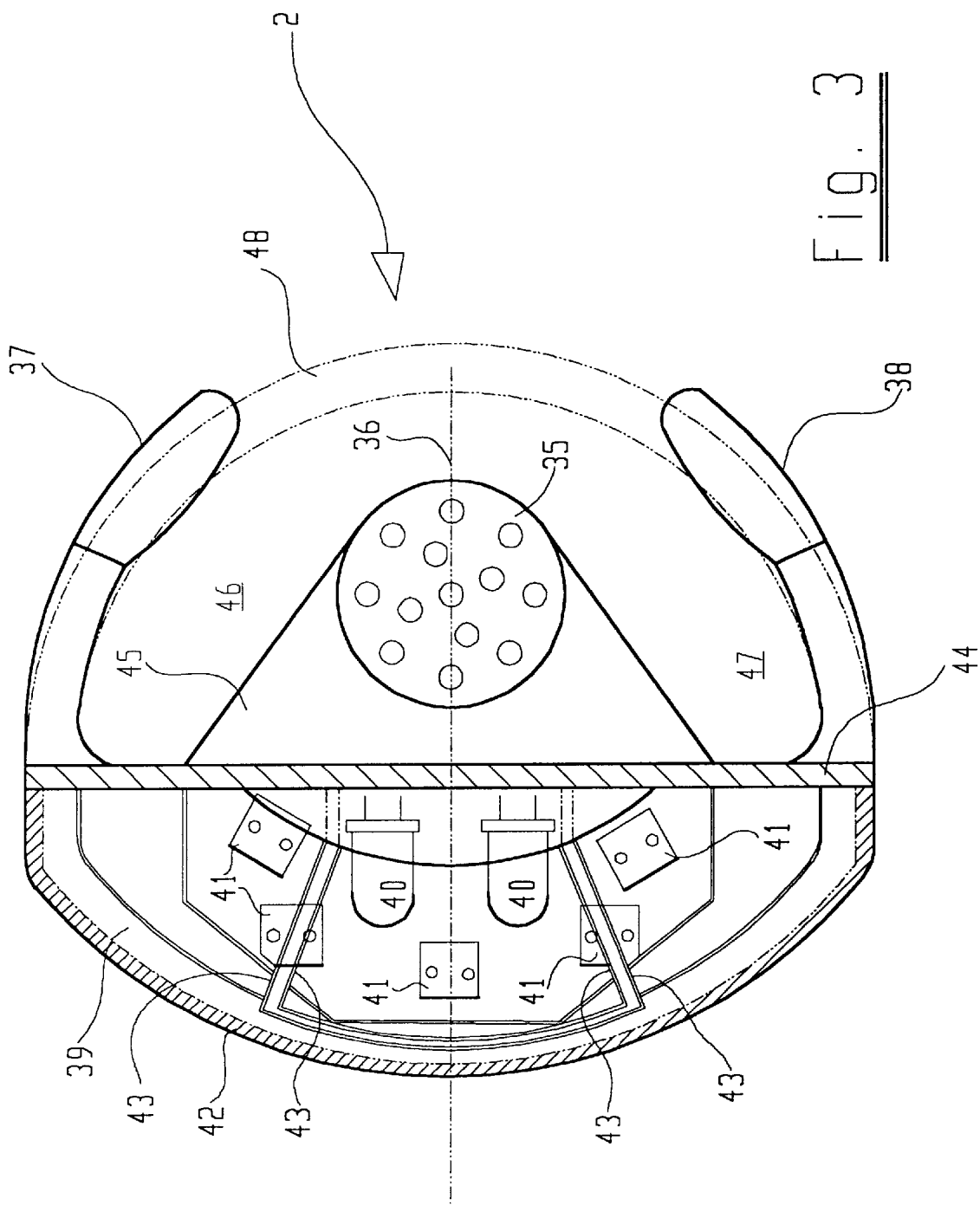
FIG. 3 shows a plan view of the earphone of both embodiments.
Figure 5:
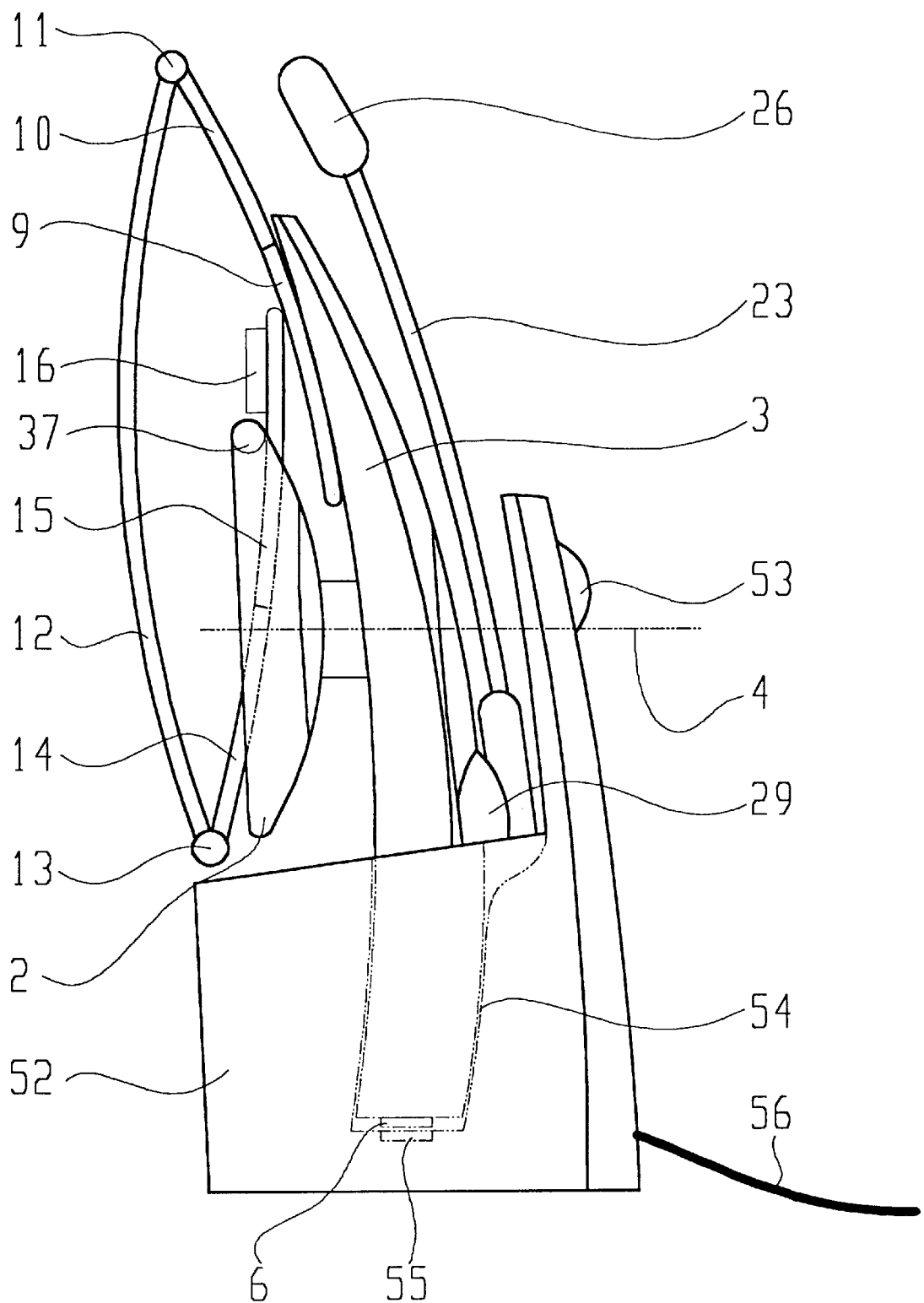
FIG. 5 shows a view of the headset in the collapsed state and inserted into a base station.

In FIG. 1, the headset is designated overall by the reference numeral 1. It comprises an earphone 2 which covers the user's ear when in use and, as described in more detail in relation to FIG. 3, is attached to the ear. The earphone is fixed to a housing 3 and can be rotated relative thereto through at least 180° about an axis of rotation 4 so that the earphone can be worn on either the left or the right ear, and a front part of the earphone 2, containing infrared transmitting and receiving diodes, always points forward in the line of sight of the user. The housing 3 accommodates in particular a preferably rechargeable battery providing the energy supply to the headset and rechargeable via contacts 6 accessible from the outside of the housing. Naturally, contactless charging of the battery is also possible, for example by inductively coupling a coil arranged in the housing and a coil of a charger. The contacts 6 are arranged in the lower region of the housing, for example on the underside 7 thereof, so that the headset, as shown in FIG. 5, can be inserted into a base station with an integral charger, thereby automatically making the contact for charging the batteries.

In the view according to FIG. 1, the housing 3 is slightly convex and therefore conforms to the shape of the head. The housing 3 extends alongside the head of the user and over the ear of the user at the side of the head as the headset is worn. Accordingly, the axis of rotation 4 of the earphone 2 is also arranged at an angle a of e.g. 7.5° to the horizontal.

Above the earphone 2, a foldable headband, designated overall by 8, is fixed to the housing 3, is convex in its entirety and has at least one resilient portion in order to adapt itself to the shape of the head and to grip the head. The headband 8 has a plurality of headband sections or portions so interconnected and so shaped that when unfolded and worn by a user the headband extends around the head and on the sides of the head toward the ears of the user. In detail, the headband 8 comprises a guide sleeve 9 which is fixed to the housing 3 and in which a first portion 10 is displaceably guided for adjustment of the effective length of the headband. The free end of this first portion 10 is pivotably connected to a resilient, convex middle portion 12 (generally, a central section) of the headband 8 by a first hinge joint 11, the other end of the middle portion 12 being pivotably connected to a third portion 14 of the headband by a second hinge joint 13. The first and third portions 10, 14 are pivotably connected for swinging movement on axes extending transversely to the headband 8. Preferably, the middle portion 12 is resiliently flexible to establish the resiliency of the headband 8. A further guide sleeve 15 is fixed to the third portion 14 and is displaceable relative to the third portion for adjustment of the length of the headband. As can be seen in FIG. 1, in the unfolded condition of the headband 8, the first portion 10 and the third portion 14 extend on the sides of the head toward the ears of the user as the headset 1 is worn by the user. A pressure part 16, by means of which the headband 8 is supported on the head above the adjacent ear of the user, is fixed to the free end of the second guide sleeve 15. Naturally, it would also be possible, instead of the pressure part 16, to provide a second earphone which is then placed on the other ear. However, for the applications intended here, it is preferred to provide only one earphone 2 so that the user can hear surrounding noises with the other ear. The pressure part 16 is mounted on the guide sleeve 15 so as to be rotatable about an axis of rotation 17 arranged parallel to a horizontal axis, and a line 18, perpendicular to a pressure surface 19, is inclined at an angle β of preferably 7.5° to the axis of rotation 17 so that the pressure part can be adapted to the shape of the user's head in an optimum manner.

The two hinge joints 11, 13 each have a stop 20, 21 respectively, restricting the pivoting movement so that the headband 8 can only be opened out as far as the operating position shown in FIG. 1. In the operating position, the first and third portions 10, 14 extend from the respective end of the middle portion 12 in continuation of the middle portion so as to extend therefrom toward the ear on the respective side of the head. For any further opening movement, only the resilient properties of the headband are effective.

A microphone 26 is fixed to the outer surface 22 of the housing 3, facing away from the user's head, on a free end of a swivel or telescopic arm 23 comprising telescopic portions 24 and 25, the microphone 26 being rotatable about an axis of rotation 27 relative to the housing 3 and being pivotable about a pivot pin 28 arranged perpendicularly to the axis of rotation 27. Consequently, the telescopic arm 23 can be moved from the position shown in FIG. 1, in which it is arranged substantially parallel to the outer surface 22 of the housing 3, into an operating position in which the microphone 26 is positioned adjacent to or in front of the user's mouth. For the same purpose, the length of the telescopic arm 23 can also be adjusted by relative displacement of the telescopic portions 24 and 25.

For rotation of the telescopic arm 23 about the axis of rotation 27, a rotary body 29 is positively fixed on or in the housing and only permits rotation about the axis of rotation 27. The pivot pin 28, to which the telescopic arm 23 is fixed by means of a mounting arm 30 engaging over the pivot pin 28, is attached to the outside of the rotary body at a distance from the outer surface 22 of the housing 3. The respective position of the telescopic arm 23 and the microphone 26 is secured by frictional forces on the axes 27 and 28. The relative position of the guide sleeve 9 and the first portion 10 or the guide sleeve 15 and the third portion 14, which are displaceable relative to one another in the direction of the arrows 31 and 32 respectively, is also maintained by frictional forces. The same also applies to the position of the telescopic arm 23.

The headband 8, or, more precisely, the guide sleeve 9, is fixed to the housing 3 via a pivot axis 17'. In this way, the entire headband can be pivoted into any position relative to the head with correct alignment of the earphone 2 and, for example, can also be positioned around the wearer's neck, which may be desirable on account of the wearer's hairstyle. In this case, the pressure part 16 also remains correctly positioned relative to the user's head since it can be pivoted via its axis of rotation 17. In all possible positions, the headset can always be supported on the head at three contact points or surfaces, namely the earphone 2, the pressure part 16 and the headband 8. This results in optimum pressure distribution and improved comfort.

Figure 2:
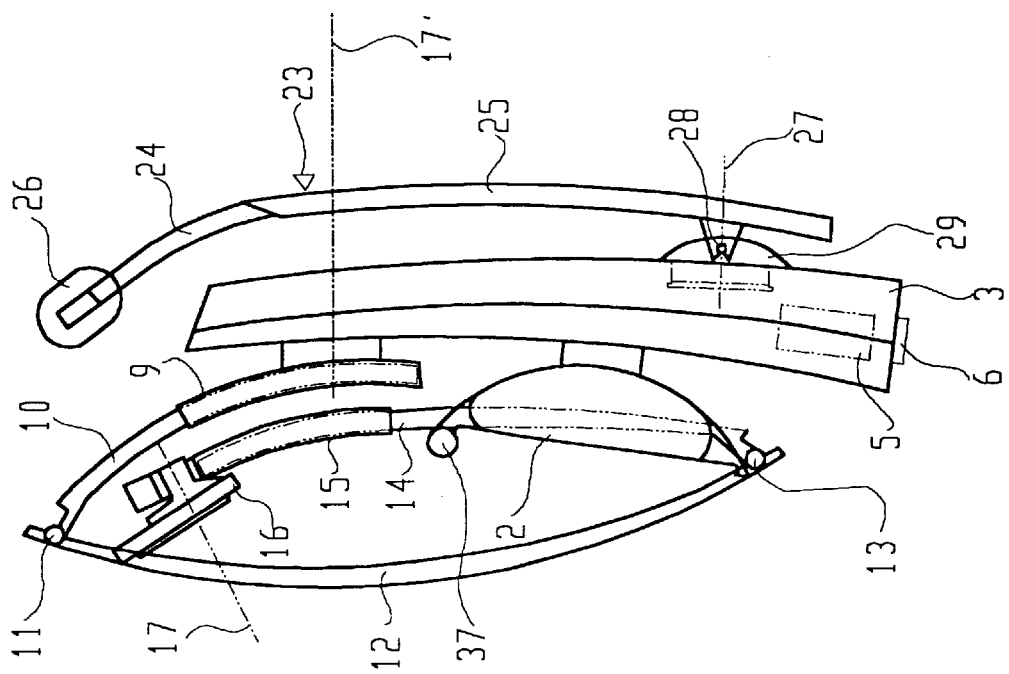
FIG. 2 shows a view of the headset in the collapsed state.

In FIG. 2, the headset 1 is folded into a collapsed position in which the headband portions lie generally alongside one another for storage and transportation. First, the third portion 14 is pivoted inwards about the hinge joint 13 in the direction of the arrow 34 towards the middle portion 12, and then the middle portion 12 together with the third portion 14 is pivoted about the hinge joint 11 in the direction of the arrow 33 (FIG. 1) towards the first portion 10, thus obtaining the compact, space saving arrangement shown in FIG. 2. A snap-locking arrangement 37', 37", (generally, retainer) the elements of which engage resiliently and thereby lock the headset in the collapsed position, is mounted on points of the guide sleeves 9 and 15 facing one another in the collapsed state. For example, a resilient snap ring, pointing outwards in the normal position of use (FIG. 1), is provided on the guide sleeve 15 and extends over a circumference of substantially more than 180°, whereas a cylindrical mounting 37" is provided on the guide sleeve 9 and likewise has a circumference extending through more than 180° so that the element 37' can surround and positively hold the element 37". This arrangement is preferred if the earphone 2 has the semi-circular ring 48 shown in FIG. 3 as an attachment clip.

Furthermore, the telescopic arm 23 with the microphone 26 is pivoted parallel to the housing so that the entire headset takes up as little room as possible when the first and third portions 10 and 14 are additionally fully inserted into the associated guide sleeves 9 and 15.

Figure 2A:
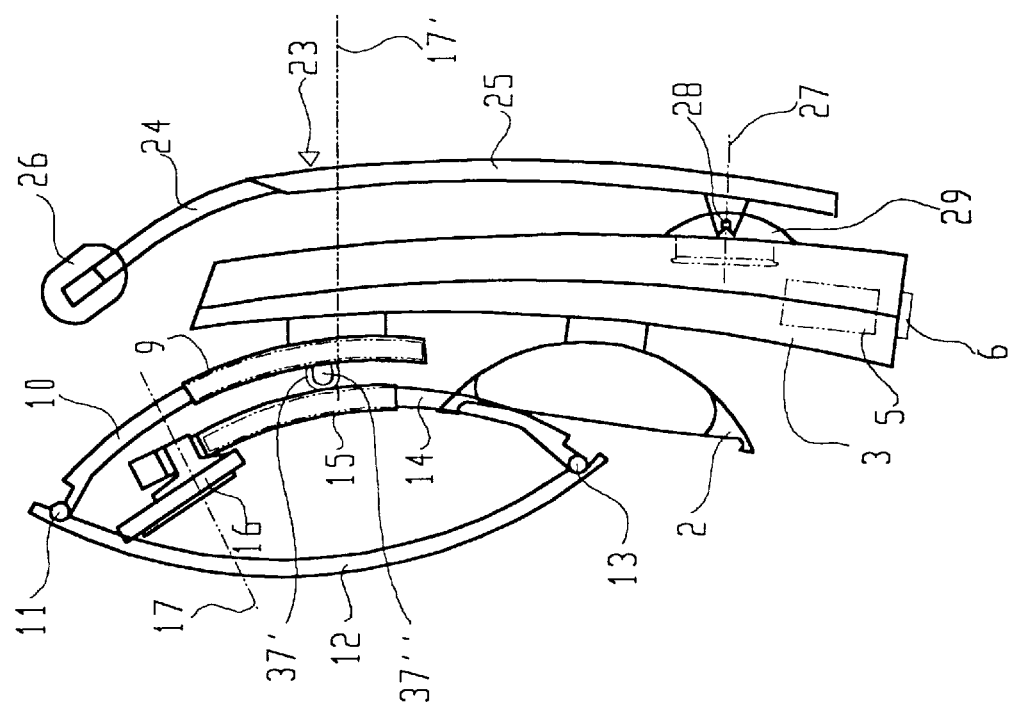
FIG. 2*a* shows a view similar to FIG. 2 of a second embodiment of the invention.

In the second embodiment, as shown in FIG. 2a, the middle portion 12 and the third portion 14 of the headband are longer than in the embodiment according to FIGS. 1 and 2. As the earphone 2, as described in further detail in relation to FIG. 3, is partly open, the third portion 14 can partly engage in the contour of the earphone 2, thereby obtaining an even more compact arrangement. In the second embodiment, by rotating the earphone 2 about the axis of rotation 4, one of the attachment clips 37 or 38 shown in FIG. 3 can be moved into a position in which it engages behind the third portion 14, thereby locking the headset in the collapsed position. Naturally, the space between the free ends of the attachment clips 37 and 38 (FIG. 3) must be at least as wide as the width of the third portion 14 or the guide sleeve 15 so that the described attachment is possible. It is also possible to form the portions 10, 12 and 14 of the headband 8 in a bipartite manner with a gap in between so that individual components, such as the earphone 2 or the pressure part 16, can engage in the gap when the headset is collapsed. In this case, the locking arrangement of FIG. 2 with the elements 37' and 37'' would again be used.

FIG. 3 shows a plan view of the earphone 2 comprising a receiver capsule 35, the two attachment clips 37 and 38 arranged mirror symmetrically to a central axis 36, and a housing 39 in which are arranged a plurality of infrared transmitting diodes 40, a plurality of infrared receiving diodes 41 and electrical and electronic components (not shown). The housing 39 is closed by a cover 42 which allows transmission of infrared light and is provided inside with a plurality of opaque partitions 43 limiting the incident and emergent range for infrared light, the radiation angle of the transmitting diodes 40 being smaller than the receiving angle of the receiving diodes 41.

In the direction of the receiver capsule 35, the housing 39 is closed by an opaque wall 44, from which the attachment clips 37 and 38 and a connector 45 project. Free spaces 46, 47 are formed between the connector 45 and the attachment clips 37 and 38 and enable either of the attachment clips 37 and 38 to be attached to the user's ear so that the receiver capsule 35 is positioned opposite the auditory canal. In this way, the infrared-transmitting cover 42 and the transmitting and receiving range of the transmitting diodes 40 and receiving diodes 41 respectively are always directed "forwards", i.e., in the line of sight of the user, and the earphone is engageable with either the left or the right ear according to the rotational position of the earphone.

Figure 4:
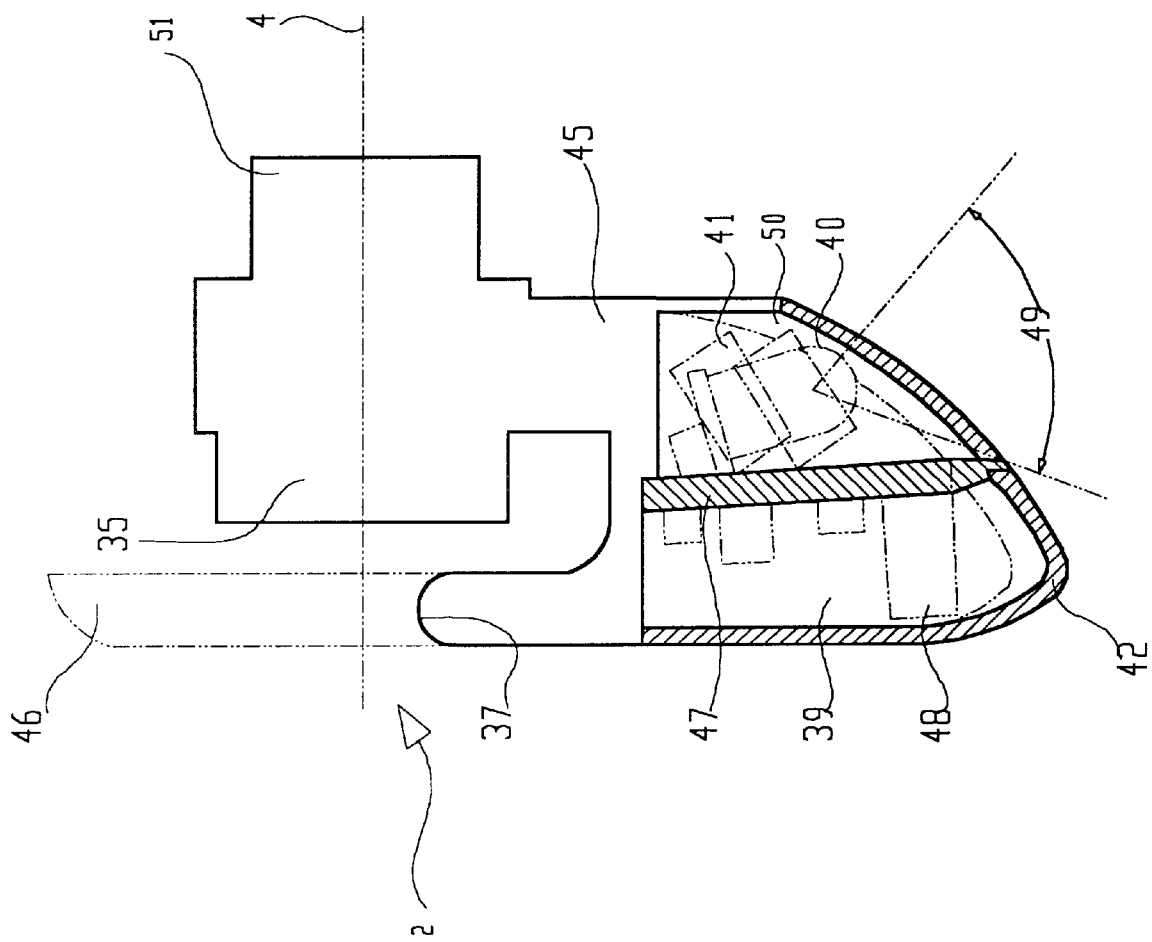
FIG. 4 shows a side view of the earphone.

It can also be seen from FIG. 3 that the two attachment clips 37 and 38 can be replaced by a substantially semi-circular ring 48 (in phantom lines) which, in the plan view according to FIG. 3, completely encloses the two free spaces 46 and 47 and also holds the earphone 2 at the rear of the user's ear. FIG. 4 shows a partly cut-away side view of the earphone 2. A board 47 is arranged inside the housing 39 and is fitted with electrical and/or electronic components and simultaneously serves as an opaque partition bounding a chamber 50 in which the IR transmitting diodes 40 and the IR receiving diodes 41 are arranged. The further partitions 43 of FIG. 3 have been omitted in FIG. 4 for the sake of clarity. They are arranged in such a manner that, for example, the transmitting diodes 40 can only radiate infrared light through the infrared-transmitting cover 42 at the radiation angle 49 of, e.g., 70°.

The attachment clip 37 and also the semi-circular ring 48 (shown by broken lines) can be seen in FIG. 4. The receiver capsule 35 is provided with a connecting piece 51, by means of which the entire earphone 2 is rotatably fixed to the housing 3 (FIG. 1).

FIG. 5 shows a base station 52 into which the collapsed headset is insertable, whether for charging the batteries or to store it when not in use. The base station 52 simultaneously serves as a transmitting and receiving station for communication with the headset via infrared light signals. For this purpose, the base station 52 has a transmitting and receiving unit 53 with at least one IR transmitting diode and at least one IR receiving diode and the necessary electrical and electronic components arranged inside the base station 52. The base station also has a receiving opening 54 adapted to the shape of the housing 3 of the headset, the lower part of the housing being insertable into the receiving opening 54, the base or sidewalls of which are provided with contacts 55 arranged opposite the contacts 6 of the housing 3 so that the headset is connected to a power supply (not shown) for charging the batteries when inserted into the base station. The base station can also have one or more receiving openings (not shown) for rechargeable accumulators so that one or more reserve accumulators can be charged while the headset is in use.

The base station 52 is connected by a cable 56 to both a power supply, for example main voltage, and an information transmission channel, for example a telephone network, a computer or other apparatus with which the headset exchanges information.

In view of the above, it will be seen that the objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A headset comprising:

a housing, a resilient, convex headband fixed to the housing, an earphone fixed to the housing and displaceable relative to one end of the headband, a microphone fixed to a swivel arm that is fixed to the housing;

the headband having first, second and third segments which pivot outwardly into an operating position defined by a generally continuous arcuate shape and which pivot inwardly into a closed position such that the first and third segments lay over the second segment with inner surfaces of the first and third segments generally facing the inner surface of the second segment;

a retainer for locking the headband in the closed position;

wherein two of said segments of the headband are pivotable on the hinge joints into the closed position in which all the segments of the headband are positioned adjacent the housing; and an infrared transmitting diode and an infrared receiving diode arranged in the earphone, and wherein the earphone is rotatable relative to the housing about an axis so that the transmitting and receiving diodes are directable in the line of sight of the wearer and form an infrared transmission line to a base station.

2. A headset according to claim 1 wherein the earphone has an attachment clip forming a free space for attaching the earphone to the ear of the wearer and extending through at least 180 degrees.

3. A headset according to claim 2 wherein the retainer comprises two attachment clips of the earphone, the free ends of the attachment clips being at a distance apart corresponding at least to the width of one of the interconnected portions of the headband, the earphone being rotatable about an axis of rotation so that one of the attachment clips engages behind said one of the interconnected portions of the headband in the closed position and thereby locks the headband in the closed position.

4. A headset according to claim 1 wherein cooperating elements of the retainer are mounted on segments of the headband which are adjacent to one another in the closed position, the elements positively engageable for locking the headband in the closed position.

5. A headset according to claim 1 wherein two of said segments of the headband are pivotable on the hinge joints into the closed position in which all the segments of the headband are positioned as close to the housing as possible.

6. A headset comprising a foldable headband comprising a plurality of headband sections so interconnected and so shaped that when unfolded and worn by a user the headband extends around the head and on the sides of the head toward the ears of the user;

said headband being resilient for gripping of the headset on the head;

a housing carried by the headband at one end thereof, said housing extending alongside the head of the user and over the ear of the user at the side of the head as the headset is worn;

an earphone on the housing engageable with the ear on said side of the head as the headset is worn:

an arm pivoted at one end thereof on the housing and having a free end;

a microphone on the arm at said free end;

said arm being swingable to bring the microphone into speaking position adjacent the mouth of the user as the headset is worn;

said headband being foldable to a collapsed condition in which said sections lie generally alongside one another for storage and transportation;

a retainer for releasably locking the headband in said collapsed condition; and wherein the headband comprises a central section convexly curved with respect to the head, said central section being resiliently flexible and establishing the resiliency of the headband, and side sections pivotably connected to opposite ends of said central section which, in the unfolded condition of the headband, extend on the sides of the head toward the ears of the user as the headset is worn by the user, each said side section being of adjustable length.

7. A headset according to claim 6 wherein the side sections of the headband are pivotably connected to the ends of the central section for swinging movement on axes extending transversely to the headband and each pivotal connection has a stop for limiting swinging movement of each side section to a position in which the side section extends from the respective end of the central section in continuation of said central section so as to extend therefrom toward the ear on the respective side of the head.

8. A headset according to claim 6 wherein the earphone is rotatable so that the earphone is adaptable to be worn over the left ear or the right ear.

9. A headset according to claim 6 wherein the earphone has an attachment clip forming a free space for attaching the earphone to the ear of the wearer and extending through at least 180 degrees.

10. A headset according to claim 6 wherein the retainer comprises two attachment clips of the earphone, the free ends of the attachment clips being at a distance apart corresponding at least to the width of one of the interconnected portions of the headband, the earphone being rotatable about an axis of rotation so that one of the attachment clips engages behind said one of the interconnected portions of the headband in the closed position and thereby locks the headband in the closed position.

11. A headset according to claim 6 wherein cooperating elements of the retainer are mounted on segments of the headband which are adjacent to one another in the closed position, the elements positively engageable for locking the headband in the closed position.

12. A headset comprising:

a housing;

a resilient, convex headband fixed to the housing;

an earphone fixed to the housing and displaceable relative to one end of the headband;

a microphone fixed to a swivel arm that is fixed to the housing; and infrared transmitting diode and an infrared receiving diode arranged in the earphone, and wherein the earphone is rotatable relative to the housing about an axis so that the transmitting and receiving diodes are directable in the line of sight of the wearer and form an infrared transmission line to a base station.

* * * * *